United States Patent [19]

Ralston, Jr. et al.

[11] Patent Number: 5,152,915
[45] Date of Patent: Oct. 6, 1992

[54] RECOVERY OF DICHLORINE MONOXIDE FROM HYPOCHLOROUS ACID SOLUTIONS

[75] Inventors: Richard W. Ralston, Jr., Cleveland; Budd L. Duncan, Athens; Ronald L. Dotson, Cleveland, all of Tenn.

[73] Assignee: Olin Corporation, Cheshire, Conn.

[21] Appl. No.: 753,560

[22] Filed: Sep. 3, 1991

[51] Int. Cl.$^5$ .............................. C01B 11/04
[52] U.S. Cl. ................... 252/186.36; 423/462; 55/71
[58] Field of Search ............ 423/466, 462, 473, 474, 423/500; 62/11; 252/187.21, 186.36; 55/71

[56] References Cited

U.S. PATENT DOCUMENTS

| Re. 31,348 | 8/1983 | Wejtowicz et al. | 423/474 |
| 4,321,795 | 3/1982 | Brandt et al. | 62/11 |

FOREIGN PATENT DOCUMENTS

| 1560614 | 2/1969 | France | 62/11 |
| WO90651 | 5/1990 | World Int. Prop. O. | 423/473 |

OTHER PUBLICATIONS

Noyes, et al., J. American Chem. Soc. 44, 1630-1637 Mar. 16, 1922.
Kirk-Othmer, Encycl. of Chem. Tech. 3rd Ed., vol. 8, pp. 116-119, 123, 124, CR1979.

Primary Examiner—Michael Lewis
Assistant Examiner—Valerie Lund
Attorney, Agent, or Firm—Allen A. Meyer, Jr.; Paul Weinstein

[57] ABSTRACT

A process for producing dichlorine monoxide which includes: feeding an aqueous solution of hypochlorous acid containing at least 20% by weight of HOCl to a reaction vessel; maintaining the temperature of the aqueous solution of hypochlorous acid in the range of from about −10° to about +40° C.; passing an inert gas through the aqueous solution of hypochlorous acid to produce a gaseous mixture comprising dichlorine monoxide, chlorine and inert gas; an contacting the gaseous mixture with dry ice to provide a solid phase of dry ice and dichlorine monoxide.

9 Claims, No Drawings

RECOVERY OF DICHLORINE MONOXIDE FROM HYPOCHLOROUS ACID SOLUTIONS

BACKGROUND OF THE INVENTION

1. Field of the Invention

This invention relates to a process for the production of dichlorine monoxide. More particularly, the invention is concerned with a process for recovering dichlorine monoxide from hypochlorous acid solutions.

Dichlorine monoxide, $Cl_2O$, has been found to be an effective reagent for the bleaching of wood pulp and textiles. Dichlorine monoxide has been made in the laboratory by the reaction of chlorine with mercury oxide, HgO. On an industrial or commercial scale, dichlorine monoxide has been prepared by reacting chlorine with sodium carbonate (soda ash) or sodium bicarbonate in the presence of controlled amounts of water. An example of this approach is found in U.S. Pat. No. 3,914,397, issued Oct. 21, 1975 to W. A. Mueller. In this process, dry gaseous chlorine in the presence of a moist dilutant gas such as air oxygen or nitrogen is reacted with alkali metal carbonates or bicarbonates in the form of dry solids having reactive open structure forms and specified surfaces areas. The process is carried out at a temperature in the range of $-20°$ C. to $+30°$ C. while maintaining the pH at 9.5 or higher.

Gaseous dichlorine monoxide has also been prepared by treating concentrated solutions of hypochlorous acid with anhydrous calcium nitrate. In U.S. Reissue Pat. No. 31,348, issued Aug. 16, 1983 to J. A. Wojtowicz et al, gaseous chlorine is passed rapidly across the surface of an agitated aqueous solution of sodium hydroxide at a reduced temperature. A gaseous mixture of hypochlorous acid, chlorine monoxide and unreacted chlorine is produced which, if dried over anhydrous calcium nitrate, produces dichlorine monoxide.

A slow current of air was passed through a dilute solution of hypochlorous acid (0.2715 N, 1.4% by wt.), through calcium nitrate to absorb water vapor, and through sodium hydroxide to absorb dichlorine monoxide in a study on the ionization of hypochlorous acid by W. A. Noyes and T. A. Wilson (J. Amer. Chem. Soc. 44, 1630-1637, 1922). Moles of dichlorine monoxide in the range of 0.0025 to 0.0114 were collected.

These methods produce mixtures of dichlorine monoxide and chlorine. However the presence of chlorine is undesirable in many applications of dichlorine monoxide.

Further, these methods have not produced dichlorine monoxide in high concentrations and volumes which could economically be used in commercial applications.

Thus there is a need for a process for producing gaseous dichlorine monoxide substantially free of chlorine. In addition, there is a need for a process for producing efficiently in amounts and concentrations for commercial applications.

SUMMARY OF THE INVENTION

These and other advantages are accomplished in a process for producing dichlorine monoxide which comprises:
a) feeding an aqueous solution of hypochlorous acid containing at least 20% by weight of HOCl to a reaction vessel,
b) maintaining the temperature of the aqueous solution of hypochlorous acid in the range of from about $-10$ to about $+40°$ C.,
c) passing an inert gas through the aqueous solution of hypochlorous acid to produce a gaseous mixture comprising dichlorine monoxide, chlorine and inert gas,
d) liquefying the gaseous mixture at a temperature below about $-20°$ C. to produce a liquid containing dichlorine monoxide and chlorine, and
e) separating the chlorine from the dichlorine monoxide.

DETAILED DESCRIPTION OF THE INVENTION

The novel process of the present invention employs as one reactant a concentrated solution of high purity hypochlorous acid, HOCl. The method of producing high purity concentrated HOCl solutions is that in which gaseous mixtures, having high concentrations of hypochlorous acid vapors and chlorine monoxide gas, and controlled amounts of water vapor, are produced, for example, by the process described by J. P. Brennan et al in U.S. Pat. No. 4,147,761. The gaseous mixture is then converted to a concentrated hypochlorous acid solution as described in WO 90/05111 Published May 17, 1990 by J. K. Melton, et. al. Each of these publications is incorporated in its entirety by reference.

The concentrated hypochlorous acid solution employed as a reactant contains concentrations in the range of from about 35 to about 60, and more preferably from about 40 to about 55 percent by weight of HOCl.

The solution is substantially free of ionic impurities such as chloride ions and alkali metal ions and has low concentrations of dissolved chlorine. For example, concentrations of the chloride ion are preferably less than about 50 parts per million and the alkali metal ion concentration is preferably less than about 50 parts per million. The dissolved chlorine concentration in the hypochlorous acid solution is normally less than about 3 percent, and preferably less than about 1 percent by weight. These highly pure, concentrated solutions of hypochlorous acid are also highly acidic, having a pH of less than about 2, for example, in the range of from about 1 to about 1.75.

In the novel process of the present invention an inert gas such as air, nitrogen, argon, carbon dioxide or mixtures thereof are passed through the concentrated hypochlorous acid solution. During the stripping of dichlorine monoxide, the hypochlorous acid solution is maintained at a temperature in the range of from about $-10$ to about $+40$, and preferably from about $0°$ to about $10°$ C. A gaseous mixture of dichlorine monoxide, chlorine, inert gas, water vapor and having traces of oxygen and hypochlorous acid vapor is produced. To remove any water vapor which may be present, the gaseous mixture is preferably dried. Suitable drying methods include, for example, contacting the gaseous mixture with a drying agent or chilling the gaseous mixture and/or passing the gaseous mixture through a molecular sieve. Drying agents which may be employed include calcium sulfate, calcium nitrate, sodium sulfate, magnesium perchlorate, perfluorosulfonic acid resins and mixtures thereof.

The dried gaseous mixture of chlorine, dichlorine monoxide and inert gas is then liquefied, for example, by cooling to a temperature below about $-20°$ C., and preferably in the range of from about −25° to about −80° C.

A liquefied mixture of chlorine and dichlorine monoxide is recovered in a collection unit at a temperature at or below −25° C.

The dichlorine monoxide is separated from the chlorine. Separation of the dichlorine monoxide from the chlorine may be accomplished by any suitable method including, for example, distillation, freezing or dissolution in selected solvents. Suitable solvents include perfluoro- and chlorofluoroalkanes such as methane or ethane, i.e. carbon tetrachloride. In one embodiment, the liquified mixture is fed to a distillation column and the temperature of the mixture raised to a temperature above the boiling point of chlorine and below the boiling point of the dichlorine monoxide. Suitable temperatures in the collection unit include those in the range of from about −80° to about +10° C., and preferably from about −20° to about 0° C. at about atmospheric pressure. Chlorine gas is separated from the liquid dichlorine monoxide.

In another embodiment, the gas mixture is condensed on dry ice. The condensed mixture of chlorine, dichlorine monoxide and dry ice are subjected to a controlled evaporation in which the carbon dioxide is first vaporized. The remaining mixture of dichlorine monoxide, chlorine and inert gas may then be fractionally condensed, for example, in a system having approximately 3 theoretical plates. At temperatures of from about −15° to about 0° C., the chlorine is evolved as a gas to produce a liquid which is essentially chlorine-free dichlorine monoxide.

The liquid dichlorine monoxide may be stored at low temperatures, dissolved in a solvent such as those listed above or converted to a solid using dry ice. Dry ice-liquid dichlorine monoxide mixtures provide a favorable matrix for storing and transporting liquid dichlorine monoxide.

Dichlorine monoxide gas may be recovered by increasing the temperature of liquid dichlorine monoxide to above about 2° C. at atmospheric pressure. The dichlorine monoxide gas produced is substantially free of impurities including chlorine and has a low percent of ionic activity.

The process of the prevent invention is further illustrated by the following examples. All percentages are by volume unless otherwise specified.

EXAMPLE 1

Nitrogen gas was fed at a rate of 1 ml/min to a cooled flask containing a hypochlorous acid solution containing 40.34% by weight of HOCl. Initially the temperature of the solution was about −4° C. A gaseous mixture was removed from the flask and passed through a packed column of $CaSO_4$ at a temperature of 0° C. A sample of the dried gaseous mixture was passed through a mass spectrometer. The gaseous mixture was cooled in a condenser to a temperature of about −40° C. and liquefied. The liquid was condensed in a container partially filled with dry ice. Dichlorine monoxide formed a stable solid phase with the dry ice while kept cold. The mass spectrometer analysis of the gaseous mixture is given in Table I below.

TABLE 1

Gaseous Mixture Stripped from HOCl Solution (Balance nitrogen)

| Time Lapsed | Temp °C. | N2 Flow ml/min | Cl2O % | Cl2 % | HOCl % | O2 % | H2O % |
|---|---|---|---|---|---|---|---|
| 0 | −4 | 0.5 | 2.28 | 7.30 | 0.25 | 0.63 | 1.42 |
| 3 | −5 | 1.0 | 2.52 | 6.60 | 0.26 | 0.64 | 1.42 |
| 5 | 0 | 1.0 | 2.77 | 5.75 | 0.28 | 0.62 | 1.42 |
| 13 | 3 | 1.0 | 3.00 | 4.00 | 0.30 | 0.62 | 1.42 |
| 19 | 4 | 1.0 | 3.37 | 4.00 | 0.30 | 0.63 | 1.42 |
| 23 | 4 | 1.0 | 3.57 | 3.75 | 0.32 | 0.64 | 1.42 |
| 28 | 4 | 1.0 | 3.81 | 3.74 | 0.34 | 0.66 | 1.42 |
| 36 | 6 | 1.0 | 3.99 | 3.74 | 0.36 | 0.67 | 1.59 |
| 41 | 8 | 1.0 | 4.07 | 3.78 | 0.36 | 0.68 | 1.59 |
| 46 | 11 | 1.0 | 4.14 | 3.78 | 0.37 | 0.69 | 1.63 |

EXAMPLE 2

Nitrogen gas was fed at a rate of 1 ml/min to a cooled flask containing a hypochlorous acid solution containing 48% by weight of HOCl. Initially the temperature of the solution was about −6° C. A gaseous mixture was removed from the flask. The gaseous mixture was cooled and liquefied in a condenser in a container partially filled with dry ice and at a temperature of about −40° C. Dichlorine monoxide formed a stable solid phase with the dry ice while kept cold. The solid phase was allowed to warm until the dry ice had evaporated and the gas formed passed through a mass spectrometer. The gas analysis (mean value for 20 gas samples) was as follows:

| | % by vol. |
|---|---|
| Dichlorine monoxide | 64.2173 |
| Chlorine | 27.4639 |
| Oxygen | 3.2954 |
| Water + $N_2$ + $CO_2$ + HOCl | 4.8075 |

What is claimed is:

1. A process for producing dichlorine monoxide which comprises:
   (a) feeding an aqueous solution of hypochlorous acid containing at least 20% by weight of HOCl to a reaction vessel,
   (b) maintaining the temperature of the aqueous solution of hypochlorous acid in the range of from about −10° to about +40° C.,
   (c) passing an inert gas through the aqueous solution of hypochlorous acid to produce a gaseous mixture comprising dichlorine monoxide, chlorine and inert gas, and
   (d) contacting the gaseous mixture with dry ice to form a stable solid phase with the dry ice.

2. The process of claim 1 accomplished by drying the gaseous mixture with a drying agent selected from the group consisting of calcium sulfate, calcium nitrate, sodium sulfate, magnesium perchlorate, perfluorosulfonic acid resins, molecular sieves and mixtures thereof.

3. The process of claim 2 in which the dry gaseous mixture contains at least 2% by volume of $Cl_2O$.

4. The process of claim 1 in which the mixture of dry ice and the solid dichlorine monoxide and chlorine is warmed to a temperature above the sublimation temperature of the dry ice to produce liquid dichlorine monoxide.

5. The process of claim 4 accomplished by distilling the liquid containing dichlorine monoxide and chlorine to separate chlorine gas from liquid dichlorine monoxide.

6. The process of claim 5 accomplished by distilling the liquid containing dichlorine monoxide at a temperature of from about −80° to about 0° C. at about atmospheric pressure.

7. The process of claim 1 in which the mixture of dry ice and the liquid containing dichlorine monoxide and chlorine is warmed to vaporize the liquid chlorine and the dry ice to produce a solution of dichlorine monoxide.

8. A composition comprised of a mixture of dry ice and liquid dichlorine monoxide at a temperature below about −20° C. containing an amount of dry ice effective to provide a matrix for storing and transporting said liquid dichlorine monoxide.

9. The composition of claim 8 in which the concentration of liquid dichlorine monoxide is at least 20% by weight of $Cl_2O$.